UNITED STATES PATENT OFFICE.

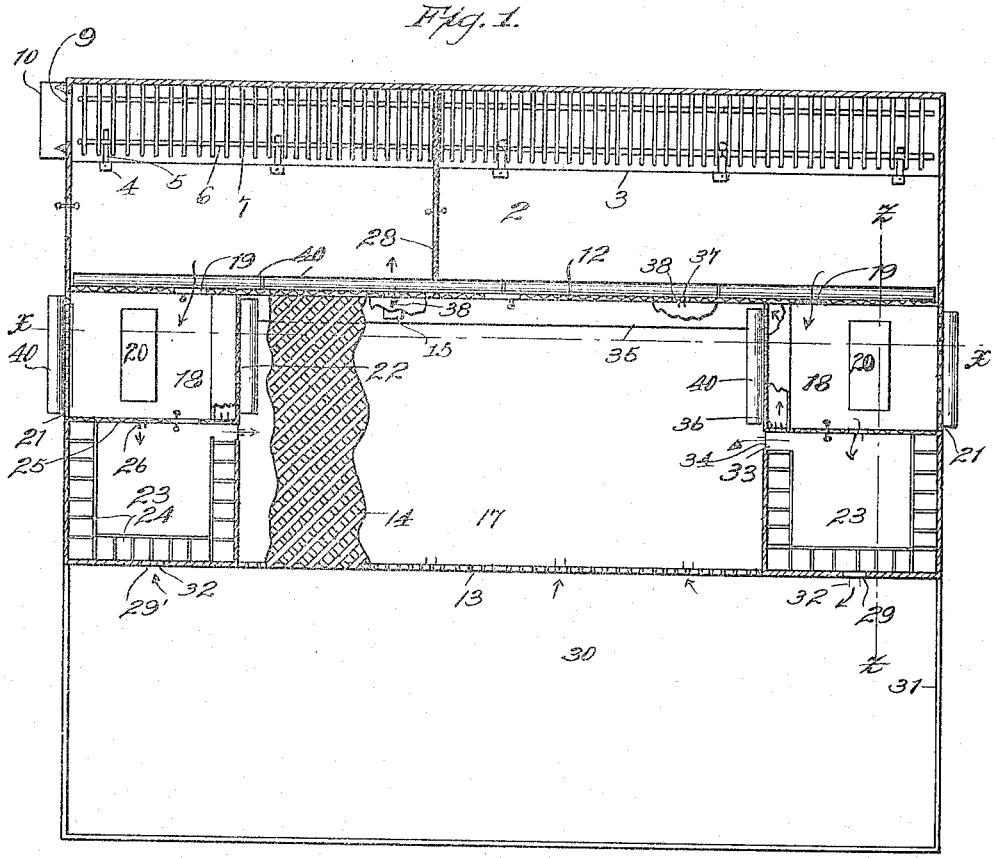

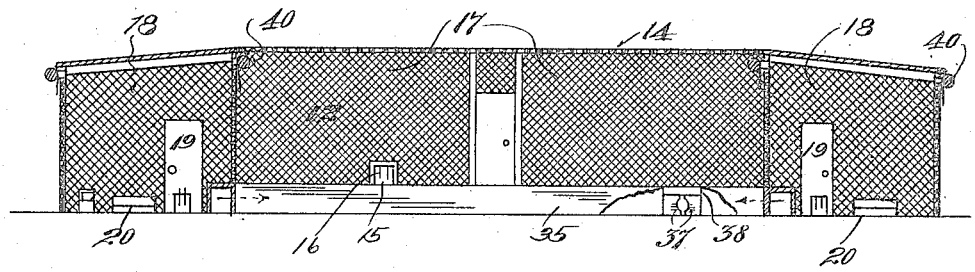
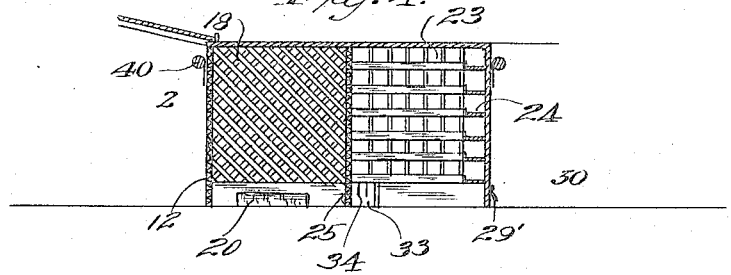
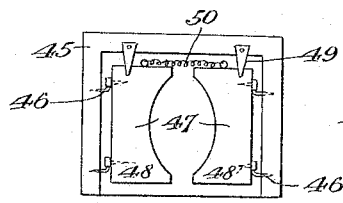

JOSEPH A. CONBOIE, OF PITTSBURG, CALIFORNIA.

POULTRY SYSTEM.

1,135,665.  Specification of Letters Patent.  Patented Apr. 13, 1915.

Application filed February 18, 1913. Serial No. 749,158.

*To all whom it may concern:*

Be it known that I, JOSEPH A. CONBOIE, a citizen of the United States, residing at Pittsburg, in the county of Contra Costa and State of California, have invented new and useful Improvements in Poultry Systems, of which the following is a specification.

This invention relates to poultry systems and particularly to an improvement in poultry systems involving a roost, a shelter, and laying rooms or nests separate therefrom, with feed compartments separate from either.

A particular object of the invention is to provide an improved poultry system in which the fowl may freely exercise in the open air at all seasons of the year and yet be protected from injurious low temperatures.

It is a further object of the invention to provide a poultry system involving a roost and shelter for relatively free communication with the open atmosphere, means being provided to prevent the creation of dangerous drafts and low temperatures, said means consisting of a substantial lattice forming a wind-break, and which system includes means for obtaining and maintaining segregation of the fowls entering the laying room from those which do not. This system also includes separated compartments for roosting, feeding and laying chickens; the structure being designed particularly to protect fowls against the dreaded "roup" which is a disease extremely fatal to chickens and which is the result of insanitary and drafty shelter houses.

The invention consists of the parts and the construction and combination of parts as hereinafter more fully described and claimed, having reference to the accompanying drawing, in which—

Figure 1 is a plan view in partial section showing the inclosed system, partly broken away. Fig. 2 is a vertical section through the roosting, feeding, laying and running compartments of the system. Fig. 3 is a vertical section on the line X—X of Fig. 1. Fig. 4 is a vertical section on the line Z—Z of Fig. 1. Fig. 5 is an enlarged detail view representative of the type of trap gates used in my invention. Fig. 6 is a detail view of the rotary baffle.

In its illustrated embodiment I have shown my improved poultry or chicken system as comprising a shed, shelter or roosting room 2, the ends, rear and top of which are made of a substantially draft-tight wall and roof structure of suitable length and width, as the conditions may require according to the number of chickens to be gathered and protected in the one apparatus.

Extending along the rear wall of the roosting shed 2, and spaced an appropriate distance above the ground, is a platform or dropping board 3 of suitable width. The platform 3 projects forwardly along the rear wall of the shed and is supported upon suitably spaced posts 4, from which project rearwardly, arms or brackets 5, upon which rest the longitudinal rails 6, of which a number of sections is provided of suitable length for roost slats. The slats and rails 6 are arranged in groups or sets of convenient length and are hinged to the rear wall of the roosting room 2, as at 8, so that the roost frame 6—7 can be tilted upwardly to allow free access to the upper surface of the dropping board 3 which may be cleansed at suitable intervals; the débris and accretions being removed through a window or opening 9, Fig. 1, at one end of the roosting room 2, which opening 9 is covered normally by a shutter or blind 10.

For the purpose of admitting light and controlling the temperature and ventilation of the roosting room 2, suitable skylights and ventilators 11, Fig. 2, are provided in the roof of the roosting room 2.

I have found by actual experience and practice in the poultry business that fowl and poultry are readily attacked by roup from improper ventilation and from drafts in the roosting room.

It is one of the important objects of the present poultry system to design and provide an apparatus in which the roosting and scratch room 2 can be thoroughly ventilated night and day, and yet effectually made draft-proof. This is accomplished by constructing one wall 12 of the roosting room 2 of a reticulated material, such as a screen or wire netting or lathing, and extending in front of and along this wall 12 a shelter, house, room, or wind-break of suitable proportion, preferably constructing the windbreak front wall 13 and roof 14 of lattice, thus leaving apertures through which free ventilation may be obtained. This also admits sufficient sunlight in the winter to render the shelter comfortable and excludes sufficient sunlight in the summer to keep the shelter cool. Access is had from the roosting room through its front reticulated wall 12 into the shelter under the roof 14 by a passage or gateway 15, Fig. 2, which may have suitable gates or shutters 16 of any suitable construction closable at will to prevent the passage of chickens. It will be seen that by this improved structure the roosting room 2 is effectually closed at three sides and the roof against drafts, while one side is freely open to the atmosphere and in communication with the shelter 17 beneath the latticed roof 14 and the front wall 13; the end walls of the shelter 17 being arranged as desired according to the structure of the system, as will be hereinafter described.

It is important in the poultry business, in order to make it profitable, that the laying and non-laying hens be segregated and appropriately disposed of or confined, as the case may be, as soon as possible after the chickens arrive at the laying age. It is one of the objects of my improved system to provide a structure or apparatus for the accomplishment of this, by separating the hens which enter the laying room from those which do not.

I have shown in Fig. 1, adjacent to the ends of the roosting room 2, compartments or rooms 18 each communicating by its respective door 19 in the reticulated wall 12 with the roosting room 2, and in these rooms or compartments 18 are provided suitable feeding devices 20. The outer walls 21 of the rooms 18, in the plane of the end walls of the roosting room 2, are preferably made of reticulated structure so that they are freely open to the atmosphere, while the inner walls 22 of the feed rooms 18 are also of reticulated or meshed material, thus providing ample and free circulation of air through the feed rooms, which is an important desideratum for the protection of the health of the poultry.

Chickens are allowed to freely pass from the roosting room 2 to and fro into the feed rooms 18. Beyond the feed rooms 18 I provide laying rooms or stalls 23, the walls of which are boarded up tightly and lined on the inner side with tiers of nests 24; access being had through mesh partitions 25 separating the feed rooms from the nest rooms. In the partitions 25 are arranged trap doors or gates 26 permitting entrance from the feed room to the laying room and preventing return therefrom; this being for the purpose of segregating the hens which enter the laying room from those which do not. It has been found that the laying hens will enter the laying rooms while the non-laying hens will pass no farther than the feed rooms, from which they may return freely into the scratch and roosting room 2.

In operation, when a number of chickens are first placed in the apparatus, they are all confined at one end of the structure by introducing and positioning a movable partition 28 transversely of the roosting room 2; the chickens having free run from the roosting room 2 into the feed room 18 at one end of the structure and the laying hens having access to the nest room 23.

The laying rooms, one at each end of the apparatus, are provided with three distinct exits. The outermost one 29 in the front wall leads into an open runway 30 which is closed on its sides by a netting fence 31; the laying hens having free run in the runway 30 and being compelled to enter the laying room at the opposite end of the runway at the entrance 29'. The exits 29 and 29' are provided with suitable trap gates 32 which the attendant positions as he desires to allow the chickens to enter one or the other of the nest rooms 23 opening into the runway 30.

When the outermost exits 29 at the front of the nest rooms 23 are closed, as would be the case in inclement weather, the laying hens may have passage through exits 33 leading into the shelter 17 beneath the lattice-work 13—14; these exits 33 being provided with trap gates 34 which prevent the return of the chicken into the nest room which it has just left. The opposite trap gate 34 is adjusted by the attendant so that the hen may freely enter the opposite nest room 23 and thence pass into the adjacent feed room 18 and contiguous end of the roosting room 2. When the weather is extremely cold or stormy, the chickens are prevented from passing through the exits 29—33, and are directed into a chamber or tunnel 35 which has an entrance, as at 36, in each nest room 23. The tunnel 35 extends along the lower portion of the reticulated wall 12 and is provided with suitable trap gates 37 covering exits 38 in the tunnel; the gates 37 being adjusted by the attendant according to which end of the roosting room 2 the laying hens are to be collected in.

One form of gate which may be employed in connection with this system is illustrated more particularly in Fig. 5. It may comprise any suitable frame member 45 provided with hinge member 46. Gates 47 are provided with complemental hinge members 48, and are carried by frame 45. These gates are preferably provided with a resilient connection 50 to insure their closing after a fowl has passed through between them. In order to prevent the gates from swinging in both directions, stops or buttons 49 may be mounted on the opposite sides of the frame in such manner that they may be turned into or out of engagement with the gates. The gates shown in this figure represent the type used at any point in my system, and are not representative of any particular gate.

From the foregoing it will be seen that I have provided a convenient, thoroughly ventilated and yet draft-protected system for the confinement of chickens or other fowls, and have also provided means for readily segregating the laying from the non-laying hens without in anywise handling or alarming the chickens, and which system is so designed in its details that ready access may be had to the several rooms or compartments which may be easily and readily cleaned at desired intervals.

For the further protection of the chickens in the roosting room at night against extremely low temperature in the colder climates, I have provided over the several reticulated walls, as may be desired, roller curtains 40 which may be drawn down by the attendant in the evening for the better prevention of cold drafts and for keeping the temperature of the roosting room and feed rooms at a sufficient degree.

In order to curb the flying propensities of the chickens allowed access to the runway 30 toward the roof of the lattice structure 13—14, I have devised and provided a baffle consisting of a rotary frame having slats 41 secured longitudinally upon wheels 42, secured on a shaft or roller 43, the ends of which are mounted in appropriate bearings 44 fastened at the ridge or eave of the lattice wall 13 and above the cornice of the laying rooms 23. The baffle device rolls freely on its journals when a chicken alights on one of the slats 41 and tumbles the chicken back into the runway 30.

Having thus described my invention, what I claim and desire to secure by Letters Patent is—

1. A system for the protection and feeding of fowl which comprises a roosting room having three weather-tight walls, a roof, and a reticulated wall at one side, with roosts along the wall opposite to the reticulated side, a wind-break or shelter structure forming a compartment along the reticulated dividing wall for preventing drafts in the roosting room and permitting free ventilation thereof, feed rooms at the ends of the roosting room to which fowl have free access, and nest rooms beyond the feed rooms and communicating therewith.

2. A system for the protection and feeding of fowl which comprises a roosting room having three weather-tight walls, a roof, and a reticulated wall at one side, with roosts along the wall opposite to the reticulated side, a wind-break or shelter structure forming a compartment along the reticulated dividing wall for preventing drafts in the roosting room and permitting free ventilation thereof, feed rooms at the ends of the roosting room to which fowl have free access, and nest rooms beyond the feed rooms and communicating therewith through a reticulated dividing wall, said feed and nest rooms flanking the shelter and communicating therewith.

3. A system for the protection and feeding of fowl which comprises a roosting room, a wind break compartment and a runway, said roosting room having three weather tight walls and a roof, said wind break compartment having reticulated walls and adapted to form a fourth wall for the roosting room, and said runway having communication at its opposite ends with the wind break compartment.

4. A system for the protection and feeding of fowl which comprises a roosting room, a wind break compartment and a runway, said wind break compartment having inter-communicating feeding and nesting rooms at each end thereof, said feeding rooms having free communication with the roosting room, and said nesting rooms having trap door communication with said runway.

5. A system for the protection and feeding of fowl which comprises a partitioned roosting room, a wind break compartment forming one wall of the roosting room, and a runway joining said compartment, inter-communicating feeding and nesting rooms at each end of said compartment, said feeding rooms having free communication with one end of the roosting room, and said nesting rooms having trap door communication with the runway, and an inclosed communicating passage leading to the roosting room.

6. A poultry feeding system comprising a roosting room having three weather tight walls, a compartment having reticulated walls forming the fourth wall of said roosting room, inter-communicating feeding and nesting rooms at each end of said compartment, a semi-inclosed scratching room between said feeding and nesting rooms, an open runway having trap door connection with said nesting room, and communications between the roosting room and the scratching compartment and between the roosting room and said feeding rooms.

In testimony whereof I have hereunto set my hand in the presence of two subscribing witnesses.

JOSEPH A. CONBOIE.

Witnesses:
 W. W. HEALEY,
 ZOE HARRISON.